INVENTOR.
Joseph W. Foster,
BY
Hume, Groen, Clement & Hume
Attorneys.

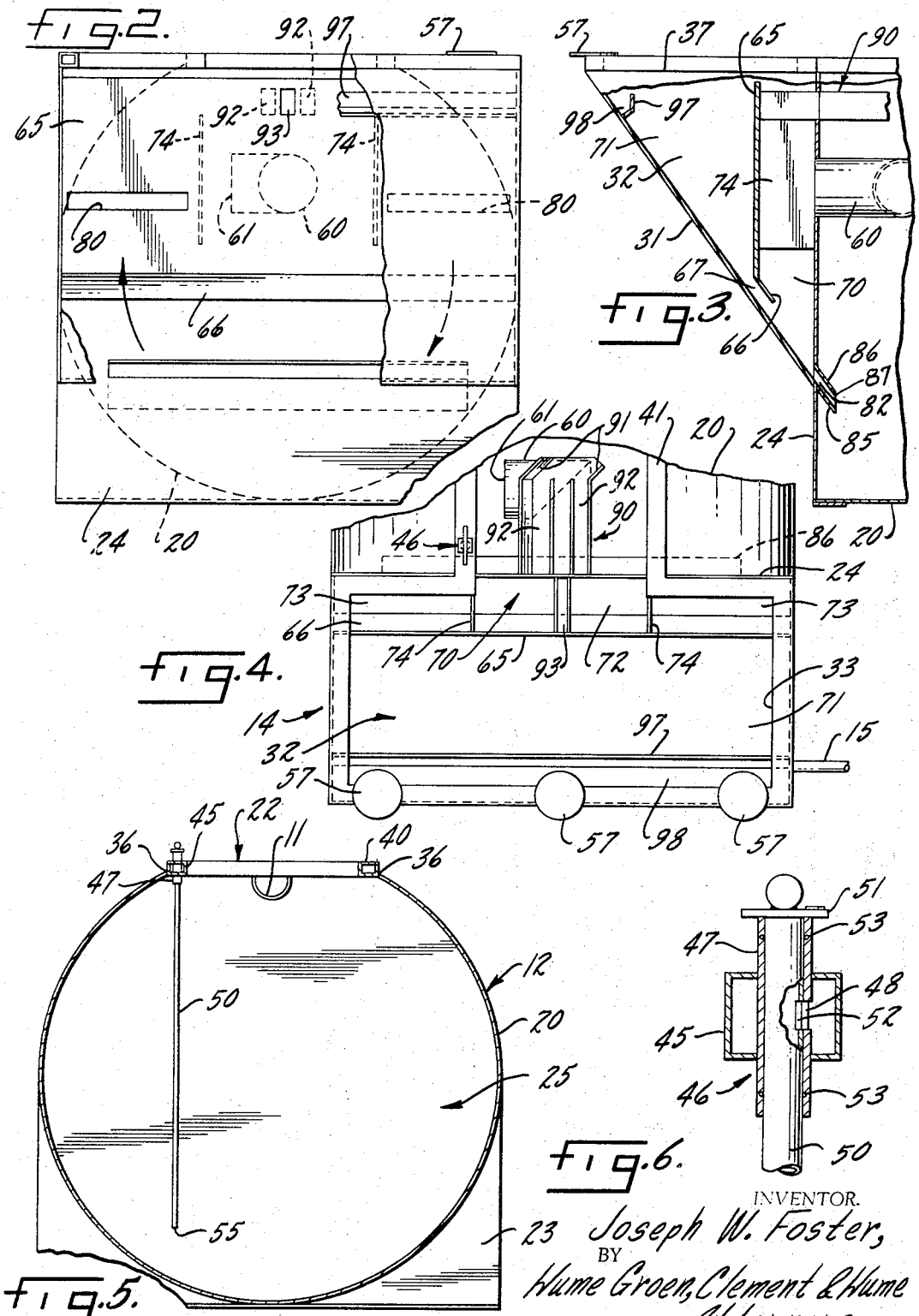

United States Patent Office 3,348,687
Patented Oct. 24, 1967

3,348,687
SEWAGE TREATMENT SYSTEM
Joseph W. Foster, Kansas City, Mo., assignor to Union Tank Car Company, Chicago, Ill., a corporation of New Jersey
Filed Mar. 31, 1965, Ser. No. 444,194
9 Claims. (Cl. 210—195)

This invention relates in general to the treatment of sewage. It deals more particularly with the aeration treatment of solid containing liquid sewage.

It is an object of the present invention to provide an improved aeration tank assembly for the treatment of solid containing liquid sewage.

It is another object to provide an aeration tank assembly including a new and improved tank construction which effects highly efficient treatment of the sewage.

It is still another object to provide an aeration tank assembly which is sturdier, yet considerably simpler in construction, than presently known tank assemblies of a broadly similar nature.

It is yet another object to provide an aeration tank assembly which incorporates a new and improved aeration system.

It is a further object to provide a sewage treatment assembly wherein highly efficient aeration treatment is carried out with minimal power requirements.

The foregoing and other objects are realized in accord with the present invention by providing a segmentally cylindrical sewage treatment tank assembly having its primary axis disposed horizontally. The aeration tank assembly includes an elongated aeration section and an adjoining settling section. Solid bearing liquid sewage introduced to the aeration section is aerated and induced to flow in a cylindrical path about the axis of the section. Sewage flowing in the cylindrical path as it is aerated is driven from the aeration section into the settling section where solids are settled out and liquid is drawn from the section.

One aspect of the present invention is that the solid bearing liquid sewage flowing in a cylindrical path in the aeration section is driven into the settling section under a substantial head. The energy of this head drives heavier solids downwardly in the settling section and back into the aeration section. At the same time, floatable solids are driven to the surface in the settling section where they are skimmed back into the aeration section. Solid bearing liquid sewage is taken from the rotating sewage in the aeration section at a point between the axis and the periphery of its flow path so that minimal solid content is present but the head developed is substantial (since the intake is somewhat removed from the peripheral heavy concentrate of solids caused by centrifugal force).

Another aspect of the present invention is that the aeration system of the aeration tank assembly is made integral with the framework of both the aeration section and the settling section. The structure of the aeration system thus enhances the strength of the tank assembly while reducing construction costs.

The invention, both as to its organization and method of operation, taken with further objects and advantages thereof, will best be understood by reference to the following description taken in connection with the accompanying drawings, in which:

FIGURE 2 is an end elevational view of the aeration tank assembly illustrating its settling section, with parts removed;

FIG. 3 is a sectional view taken through the settling section end of the aeration tank assembly along the longitudinal axis of the tank assembly;

FIGURE 4 is a plan view of the settling section;

FIGURE 5 is a sectional view through the aeration section taken along line 5—5 of FIGURE 1; and FIGURE 6 is an enlarged sectional view of a portion of the aeration system.

Figure 1:
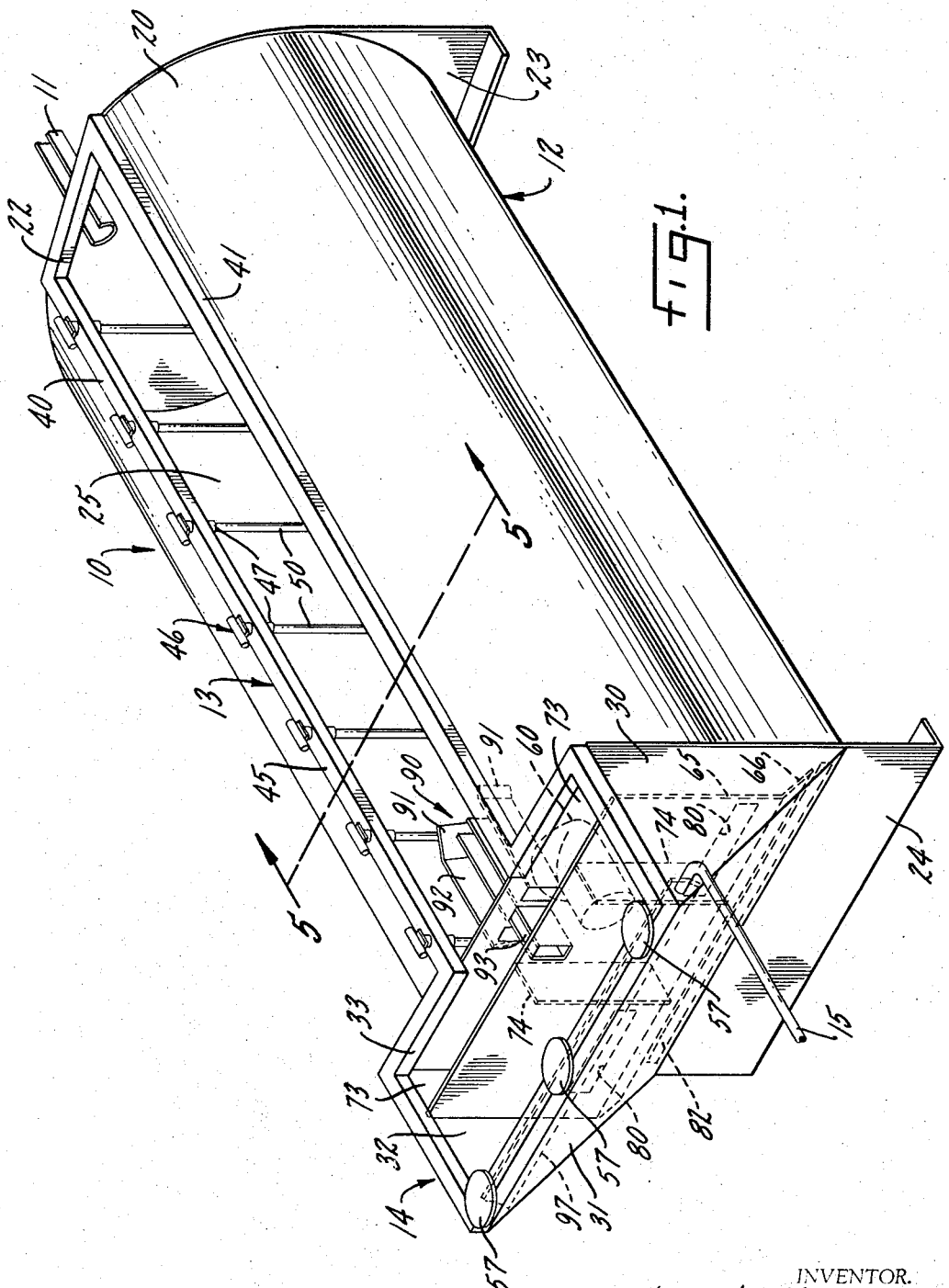
FIGURE 1 is a diagrammatic persepective view of an aeration tank assembly embodying features of the present invention.

Referring now to the drawings, and particularly to FIGURE 1, a sewage treatment aeration tank assembly embodying features of the present invention is illustrated generally at 10. The aeration tank assembly 10 receives raw solid bearing liquid sewage through a conventional inlet pipe 11 and this solid bearing liquid sewage is treated according to the present invention in the aeration section 12 by an aeration system 13.

Aeration treatment of the sewage in the section 12 is continuous and, similarly, the transfer of aerated sewage from the aeration section 12 to the settling section 14 is continuous during operation of the tank assembly 10. According to the present invention, solid bearing liquid sewage which enters the settling section 14 is driven into the section 14 under a substantial head. As will hereinafter be discussed in detail, this head effects greatly enhanced return of solids and liquid to the aeration section 12. At the same time, relatively clear liquid is continuously drawn from the settling chamber 14 through an effluent pipe 15.

The areation section 12 includes a segmentally circular cylindrical wall 20 formed of sheet steel or the like. An outer end wall 23 of any suitable configuration is welded to and closes the inlet end of the aeration section 12 while an inner end wall 24 is welded to and closes the outlet end of the tank unit 12. The walls 20, 23, and 24 form an aeration chamber 25 having a rectangular opening 22 at its top. Furthermore, the inner end wall 24 forms a common wall with the settling section 14 and provides communication between the sections 12 and 14 in a manner hereinafter discussed in detail.

The settling section 14 is generally wedge-shaped in configuration. The section 14 includes triangularly shaped side walls 30 and a rectangular outer end wall 31 welded to each other and to the wall 24 to form a settling chamber 32 having a generally rectangular open top 33.

Mounted on the wall edges 36 defining the open top 22 of the aeration section 12 and the wall edges 37 defining the open top 33 of the settling section 14 is the aeration system 13. The aeration system 13 comprises an air header 40 in the form of a generally rectangular air conduit 41 fabricated of sheet steel or the like. The conduit 41 is a continuous structural member which conforms in shape to the collective upper edge 36, 37 of the sections 12 and 14, respectively, and, accordingly, is generally T-shaped in configuration. The air header conduit 41 is welded to corresponding edges in a well-known manner. The header conduit 41 is, accordingly, substantially integral with the aeration and settling sections 12 and 14 and serves to rigidify them and enhance the overall strength of the tank assembly 10.

The air header conduit 41 is also, as would be expected, fabricated of sections of conduit welded together. One of these sections 45 extends along one side of the open top 22 of the aeration section 12. A series of individual air diffusers 46 are mounted on the section 45 and receive air under pressure from the conduit 41. The diffusers 46 release the air in the aeration chamber 25 to aerate the solid laden liquid sewage therein.

Each diffuser 46 is identical in construction and, as seen in FIGURE 6, includes a support pipe 47 extending vertically through suitably formed apertures in the air header conduit section 45 and welded thereto in air tight relationship. An aperture 48 in the support pipe 47 within the conduit section 45 provides communication with the inside of the conduit section.

Extending through each support pipe 47 and suspended therefrom is an air diffuser drop pipe 50 having a closure cap 51 welded to its upper end in air tight relationship. A suitably formed aperture 52 in the portion of the drop pipe 50 extending through the support pipe 47 communicates with the interior thereof and, accordingly, with the air header conduit section 45, to receive air under pressure from the air header 40. Conventional O-ring seals 53 are provided within the support pipe 47 to forestall leakage around the drop pipe 50.

The lower end of the pipe 50 is open at 55 to permit the escape of air. The open end 55 is, by virtue of the calculated length of the drop pipe 50, spaced a short distance from the wall 20 of the aeration unit 12 (see FIGURE 5).

Since the air diffusers 46 depend from only one side section 45 of the air header conduit 41, they are disposed considerably to one side of the axis of the cylindrical aeration section 12. Consequently, air released from the open pipe ends 55 causes solid bearing liquid sewage which has been introduced to the tank unit 12 to rotate in a clockwise (looking at the assembly 10 from the settling section end 14) direction about the axis. The air which is supplied to the diffusers 46 from the air header 40 is introduced thereto under pressure from conventional air compressors (not shown) mounted in suitable relationship on compressor mounts 57.

As the solid bearing liquid sewage in the tank unit 12 rotates it is aerated by the myriads of rising air bubbles. Aerobic digestion of the solid material takes place to form "activated" sludge. At the same time, liquid, carrying with it solid materials, is driven into the settling section 14.

The liquid bearing some solids is driven into the settling chamber 32 through an elbow pipe 60 having its open mouth 61 disposed normal to the rotational flow of sewage in the aeration chamber 25. The elbow pipe 60 is secured to the common wall 24 of the assembly 10 and communicates through the wall with the chamber 32 so that sewage which enters the mouth 61 passes through the member 60 into the settling chamber.

As would be expected, the rate of rotational flow of solid bearing liquid sewage is greatest at the periphery of the chamber 25 in the cylindrical aeration section 12 and least adjacent the axis of the tank. However, the solid particle density in the liquid adjacent the periphery of the rotational flow is also greatest because of centrifugal force developed by such flow. To obtain the beneficial head developed by a substantially fast liquid flow while limiting the intake of solids, the elbow member 60 is positioned on the wall 24 so that its mouth 61 is disposed approximately one-half the distance between the axis of the section 12 and the peripheral wall 20 thereof.

The sewage which enters the chamber 32 through the elbow pipe 60 has considerable kinetic energy, as will now be recognized. To absorb a portion of this energy, and control the effects of the remainder of it, an energy absorption baffle 65 is positioned in the chamber 32 extending between the oppositely disposed walls 30 of the settling section 14. The baffle 65 extends from the upper edges 37 of the side walls 30 vertically down to a point slightly spaced from the inclined end wall 31 of the section 14 where the baffle terminates in a lip 66 extending parallel to the end wall 31 and defining a passage 67 therebetween. The baffle thus divides the chamber 32 axially of the assembly 10 into an energy absorption chamber 70 and an effluent chamber 71.

The energy absorption chamber 70 is, in turn, divided transversely of the assembly 10 into an inlet sub-chamber 72 and bracketing side subchambers 73 by vertically disposed baffles 74 which terminate short of both the upper edges of the plate 65 and the lower lip 66 thereof. The side subchambers 73 communicate with the effluent chamber 71 through horizontally elongated ports 80 in the baffle 65 (as well as being open at top and bottom).

When the column of liquid (bearing some solids) enters the inlet sub-chamber 72 of the energy absorption chamber 70 and is driven against the baffle 65, a substantial portion of its energy is absorbed. Both a downward and upward component of force remain, however, and this tends to drive heavier solids toward the bottom of the energy absorption chamber 70 and lighter solids toward the top, as contained by the baffles 74, while the liquid tends to circulate around the baffles 74 into the side subchambers 73 where it finds access to the effluent chamber 71 through the ports 80.

The solids still remaining in the liquid when it enters the effluent chamber 71 tend to settle by force of gravity in this relatively still medium and these solids pass through the passage 67 toward the bottom of the settling chamber 32. The settling solids reenter the aeration chamber 25 through a passage 82. The passage 82 extends substantially across the width of the chamber 25, as illustrated best in FIGURE 2.

Viewing the passage 82 as illustrated in FIGURE 2, a downwardly inclined deflector plate 85 extends from its lower edge and another downwardly inclined deflector plate 86 extends from its upper edge into the chamber 25. Rotational flow of solid bearing liquid sewage in the chamber 25 past the mouth 87 between the plates 85 and 86 tends to create a suction in the passage 82 and draw liquid and settled solid material in the chamber 32 back into the chamber 25. The flow of liquid and settled solids back into the chamber 25 is further enhanced by the downward force component of liquid in the energy absorption subchamber 74 (hereinbefore referred to).

At the same time that the bulk of the solid material which enters the settling chamber 32 is settling, some of it rises to the liquid surface. To remove this floating scum from the liquid, a surface skimmer assembly 90 is provided extending between the settling chamber 32 and the aeration chamber 25. Since the surface skimmer assembly 90 forms no part of the present invention, however, it is not described here in substantial detail. Suffice it to say that the clockwise rotational flow of the solid bearing liquid sewage in the chamber 25 flowing past transversely inclined plates 91 serves to create a suction in passages 92 connecting the energy absorption chamber 70 with the aeration chamber 25 and in the passage 93 connecting the effluent chamber 71 with the chamber 25. These passages 92 and 93 are disposed at the surface of the liquid in the assembly 10 and, accordingly, the suction draws surface scum back into the aeration chamber 25 from the settling chamber 32.

While the foregoing sewage treatment is taking place, a portion of the relatively clear liquid which remains in the effluent chamber 71 continually passes out of the chamber over the effluent weir 97 into a trough 98 which is connected to the effluent pipe 15. This withdrawn liquid is disposed of in a well-known manner.

The aeration tank assembly which has been described affords numerous advantages not found in broadly similar tanks used today. For example, the horizontal segmentally circular cylinder construction develops maximum rotation of the sewage being aerated with minimum horsepower input required for the aeration system. The cornerless construction eliminates many areas where solids can accumulate and stay out of the path of treatment.

The aeration system is actually incorporated in the framework of the tank assembly 10. The header conduit 41 thus rigidifies the tank assembly 10 and enhances its strength.

Sewage flow from the aeration chamber 25 into the settling chamber 32 is positively effected by the energy of rotation of the sewage and a substantial head is developed. This head assists in returning liquid and solids in the chamber 32 to the chamber 25. Furthermore, the return flow of settling solids is in the same direction as the flow of liquid which returns to the aeration chamber 25 and not contra to it, as is the case in most prior art devices.

What is claimed is:

1. A tank assembly for the aeration treatment of solid bearing liquid sewage, comprising: a generally cylindrical aeration chamber having its major axis disposed in a substantially horizontal plane, means for emitting air in said aeration chamber to cause rotation of the sewage in a generally circular flow path about said axis as the sewage is aerated, a settling chamber at one end of said aeration chamber for receiving solid bearing liquid from said aeration chamber and settling solids therefrom, transfer means for transferring sewage from said aeration chamber to said settling chamber, said transfer means including passage means having an inlet mouth in said aeration chamber, said inlet mouth being located between said axis and the outermost periphery of said aeration chamber, said inlet mouth opening in a direction generally counter to said flow path and thus facing into the rotating sewage so as to cause sewage to flow directly into said mouth without substantially changing its flow direction, whereby said settling chamber receives sewage having considerable kinetic energy but is prevented from receiving solids held at the periphery of said aeration chamber by centrifugal force, and means for returning solids from said settling chamber to said aeration chamber.

2. The tank assembly of claim 1 further characterized in that said air emitting means is spaced horizontally to one side and vertically below said axis.

3. The assembly of claim 1 further characterized in that said returning means includes first additional passage means interconnecting said chambers adjacent the bottom of said settling chamber and below said transfer means, and means in said aeration chamber effective to draw settled solids from said settling chamber through said first additional passage means into said aeration chamber.

4. The assembly of claim 3 further characterized in that said returning means includes second additional passage means interconnecting said chambers adjacent the top of said settling chamber and above said transfer means, and means in said aeration chamber effective to draw floatable solids from said settling chamber through said second additional passage means into said aeration chamber.

5. The tank assembly of claim 4 further characterized in that said aeration chamber includes a truncated, cylindrical side wall and oppositely disposed end walls, said settling chamber including a pair of side walls and oppositely disposed end walls, said transfer means for transferring sewage from said aeration chamber to said settling chamber extending through at least one of said end walls between said chambers, and energy absorption baffle means in said settling chamber opposite said transfer means for absorbing a portion of the energy of the stream of solid bearing liquid entering said settling chamber and directing solids in said stream toward said first and second additional passage means for return to said aeration chamber.

6. The tank assembly of claim 5 further characterized by and including axially extending side baffle means bracketing the opening of said transfer means into said settling chamber and extending between its one end wall and said energy absorption baffle means to form a central subchamber and side subchambers bracketing said central subchamber.

7. The tank assembly of claim 6 further characterized by and including effluent port means from said side subchambers formed in said energy absorption baffle means.

8. The tank assembly of claim 5 further characterized in that said aeration chamber and said settling chamber have one common end wall, said chambers having a generally continuous open top defined by the upper peripheries of said side and end walls, said air emitting means including air header conduit means integral with said peripheries at said open top to rigidify and strengthen said tank assembly.

9. The assembly of claim 1 further characterized in that said inlet mouth is located approximately half-way between said axis and said outermost periphery of said aeration chamber.

References Cited

UNITED STATES PATENTS

| 2,154,132 | 4/1939 | Mallory | 210—15 X |
| 3,195,727 | 7/1965 | Kibbee | 210—221 X |

FOREIGN PATENTS

| 504,992 | 8/1930 | Germany. |
| 561,395 | 2/1933 | Germany. |
| 773,013 | 4/1957 | Great Britain. |

REUBEN FRIEDMAN, *Primary Examiner.*

SAMIH N. ZAHARNA, *Examiner.*

JAMES L. DeCESARE, *Assistant Examiner.*